Sept. 22, 1931.  R. LINN  1,824,675
SIDE CAR FRAME FOR BICYCLES
Filed Oct. 23, 1930  2 Sheets-Sheet 1
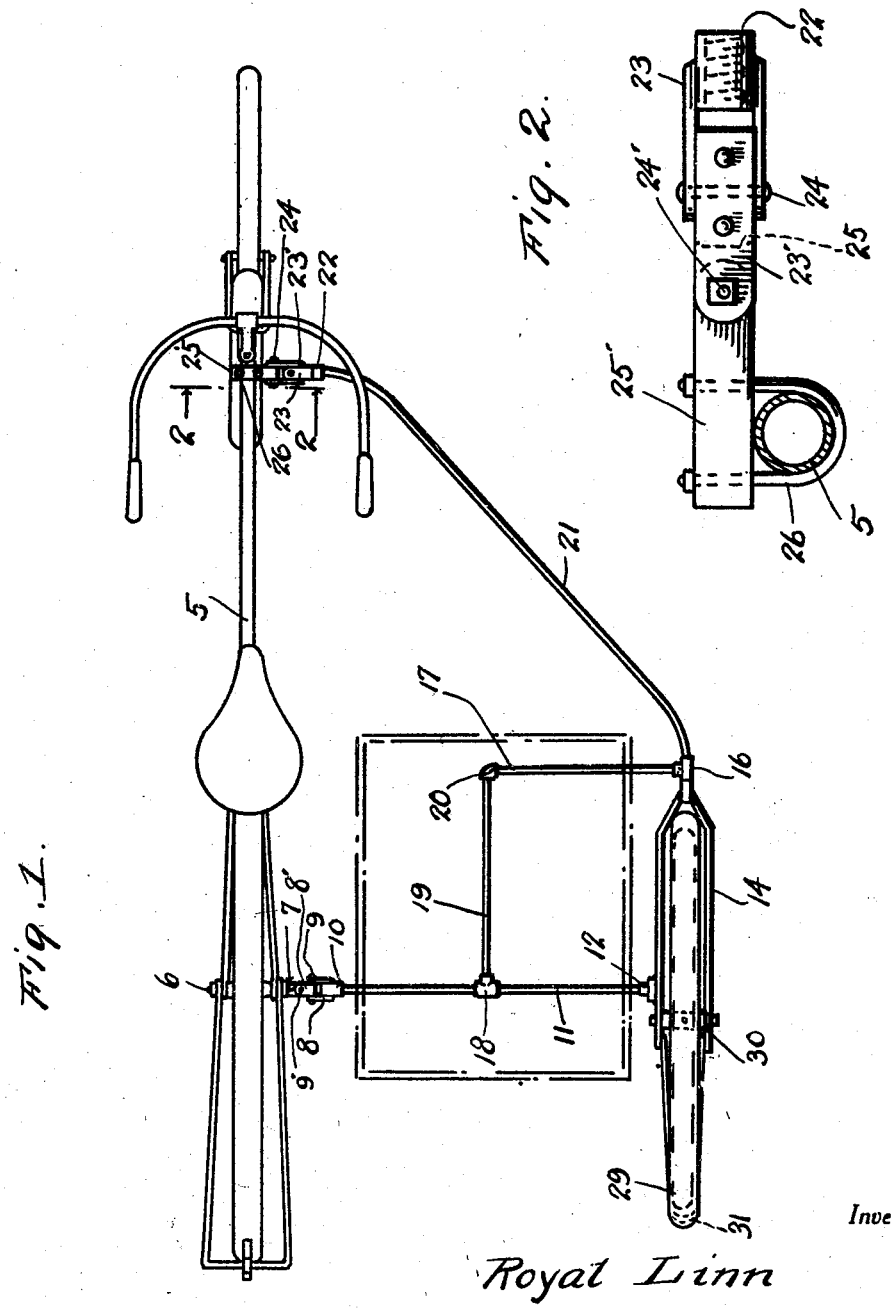
Inventor
Royal Linn
By Clarence A. O'Brien
Attorney Sept. 22, 1931.     R. LINN     1,824,675
SIDE CAR FRAME FOR BICYCLES
Filed Oct. 23, 1930     2 Sheets-Sheet 2
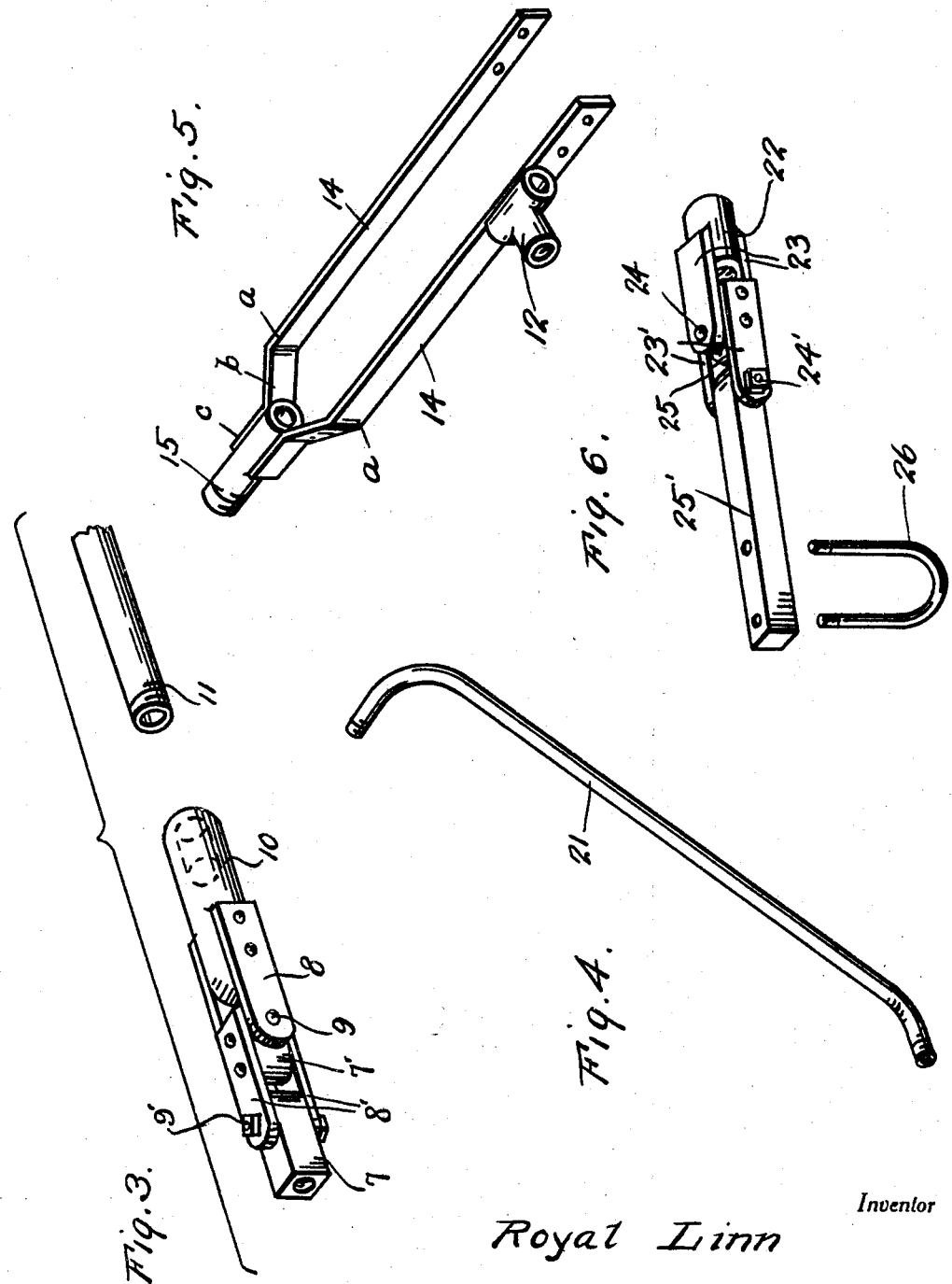
Inventor
Royal Linn
By Clarence A. O'Brien
Attorney Patented Sept. 22, 1931

1,824,675

UNITED STATES PATENT OFFICE

ROYAL LINN, OF SPRINGFIELD, ILLINOIS

SIDE CAR FRAME FOR BICYCLES

Application filed October 23, 1930. Serial No. 490,782.

The present invention relates to a side car frame for bicycles and has for its prime object to provide a structure which is exceedingly simple, inexpensive to manufacture, strong and durable, having parts capable of being assembled and disassembled with respect to each in an easy manner, and means whereby the frame may be easily and quickly connected with and detached from the bicycle.

Another very important object of the invention resides in the provision of a detachable side car frame structure of this nature which is compact and convenient in its arrangement of parts, thoroughly efficient and reliable in use, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a top plan view of the bicycle with my improved side car frame attached thereto, Figure 2 is an enlarged detail section taken substantially on the line 2—2 of Figure 1, Figure 3 is a perspective view of the attaching means for the rear axle, Figure 4 is a perspective view of the diagonal brace bar, Figure 5 is a perspective view of the fork.

Figure 6 is a perspective view of the bicycle bar attachment means.

Referring to the drawings in detail it will be seen that I have illustrated in the drawings a conventional bicycle which includes among other elements upper longitudinal bar 5 and rear axle spindle 6. A block 7 is threadedly engaged on the spindle 6 which usually projects outwardly from one side. Arms 8 are pivotally connected by a bolt 9 with the block 7 and are fixedly attached to a socket block 10 in which is threadedly engaged a bar 11. The pivot bolt 9 extends through a block 7' to which arms 8' are rigidly secured, said arms 8' being pivotally connected to the block 7 by a pivot bolt 9' disposed at right angles to the pivot bolt 9. The bar 11 is engaged in a socket 12 which is mounted on a form 14 which comprises a pair of side members $a$ with ends converging toward each other as at $b$ and terminating in parallel portions $c$ fixed to a stud 15. The stud 15 is adapted to be threaded in a T-coupling 16 in which is also engaged a bar 17. A T-coupling 18 is mounted on an intermediate portion of the bar 11 and has a forwardly directed bar 19 engaged therewith and coupled with the bar 17 by an elbow 20. Thus a substantially rectangular frame is formed on which may be rested a suitable side car body. A diagonal brace bar 21 is threadedly engaged with the coupling 16 and also threadedly engaged with a socket block 22. Arms 23 are fixed to the block 22 to extend beyond the end thereof and are pivotally connected by a bolt 24 with a block 25. Arms 23' are rigidly connected to the block 25 and are pivotally connected by a bolt 24' to a bar 25' with which is engaged a U-shaped bolt 26 circumjacent the bar 5 of the bicycle adjacent the forward end thereof. Now, the side car frame may be detached by removing bolts 9 and 24 as will be readily apparent. A wheel 29 is rotatably mounted between the extremities of the sides $a$ of the form 14. A brace bar 30 extends between the arms of the form 14 and the mud guard 31 which is provided over the wheel 29.

It is thought that the construction, utility and advantages of this invention will now be quite apparent to those skilled in this art without a more detailed description thereof. The present embodiment of the invention has been described in considerable detail merely for the purposes of exemplification since in actual practice it attains the features of advantage enumerated as desirable in the statement of the invention and the above description.

The universal joints which connect the rods 11 and 21 to the bicycle provide means whereby said bicycle may be caused to lean in the usual manner when rounding curves.

It will be apparent that changes in the details of construction, and its combination and arrangement of parts may be resorted to without departing from the spirit and scope of the invention as hereinafter claimed or sacrificing any of its advantages.

Having thus described my invention, what I claim as new is:—

1. In a frame structure of the class described, a fork, a bar extending laterally from the fork, a wheel journaled in the fork, a bar extending diagonally from the fork, blocks on the ends of the bars, a pair of arms projecting from each block, other blocks pivotally mounted between the arms one of which is provided with an internally threaded socket and a U-shaped bolt for the other.

2. In a bicycle side car frame structure of the character described, a fork, a wheel journaled in the form, a bar extending laterally from the fork, a block threadedly engaged with one end portion of the rear wheel spindle of the bicycle, a universal joint connecting the bar to the block, a bar extending diagonally from the fork, a block secured to the frame of the bicycle, and a universal joint connecting the last named block to the diagonal bar.

In testimony whereof I affix my signature.

ROYAL LINN.